Feb. 27, 1968      H. V. BRYAN      3,370,505

PANORAMIC PICTURE EXHIBITING APPARATUS

Filed April 30, 1965      2 Sheets-Sheet 1

INVENTOR
HELEN V. BRYAN
BY Roger G. Marrs
AGENT

Feb. 27, 1968     H. V. BRYAN     3,370,505
PANORAMIC PICTURE EXHIBITING APPARATUS
Filed April 30, 1965     2 Sheets-Sheet 2

INVENTOR
HELEN V. BRYAN
BY Roger A. Marrs
AGENT

United States Patent Office

3,370,505
PANORAMIC PICTURE EXHIBITING APPARATUS
Helen V. Bryan, Los Angeles, Calif.
(16725 Knollwood Drive, Granada Hills, Calif. 91344)
Filed Apr. 30, 1965, Ser. No. 452,287
10 Claims. (Cl. 88—24)

ABSTRACT OF THE DISCLOSURE

A hemispherical mask is provided having a plurality of openings in which a viewing screen is mounted so that when a picture is thrown on the rear of the screen, the edge marginal areas of the picture are blocked from audience view by the presence of the mask. The audience is arranged in the center of the mask structure so that the plurality of screens can carry a 360° feature film production. A circular stage is provided surrounding the audience with a viewing screen behind selected portions of the stage whereby the picture on each screen constitutes a background for the action on the stage.

---

The present invention relates to apparatus for still or motion picture presentations and more particularly relates to a novel film projection and presentation apparatus providing the illusion of a continuous picture on a composite circular screen.

It has been a conventional practice in the motion picture industry to provide a seemingly continuous motion picture covering a circular field of 360° by employing a plurality of curved screens arranged in a circle with the audience being located within the space encompassed by the screen. One or more film projectors are usually associated with each screen and the resulting plurality of projectors are sometimes disposed centrally of the screen or are disposed behind the screen for rear projection.

However, the central positioning of the projectors and presence of a projectionist seriously limits the amount of space available to accommodate an audience. Further, the space occupied by the centrally located projectors at the center of the screen is the optimum location for viewing the picture. The location of the projectors at the center of the viewing area also constitutes a serious source of disturbance to the audience because of the noise, light and heat attendant to the operation of the projector equipment.

To avoid the difficulties and problems attendant to centrally located projectors within the theatre, the motion picture industry has sometimes used a method or procedure known as "rear projection" according to which a still or moving picture is projected onto the backside of a translucent screen. This procedure has sometimes been found desirable since the projectors can be remotely located from the audience so that picture images can be projected on the reverse side of a translucent screen which can then be viewed from the front of the screen by the audience. This procedure also permits the screen to be used as a backdrop for settings during dramatic presentations so that actors performing in the drama can move about in front of the screen without interfering with the projection of images from the projector.

In most circular or 360° screening systems, when front projection is employed, some of the light projected against such a curved screen or screens is "scattered" or diffused radially so as to strike other areas, thereby degrading the images projected upon the screen. Also, generally, the plurality of curved screens in a conventional system are arranged in a side-by-side relationship whereby images projected from a plurality of projectors form continuous images along the blend lines where adjacent component images join. The employment of such a system necessitates that the films to be projected must be carefully matched with regards to color, action and timing which is expensive and time consuming. In the past, a serious viewing condition has been encountered when employing such systems which is known as "image distortion" that occurs in the areas of the composite images along the blend lines where adjacent component images join. This image distortion may be a disproportionate change of image size either in expansion or shrinkage, and under extreme conditions there may be complete disapperance of an object during the passage through a blend area from one part of the component image to another. Also, under some circumstances, a bright streak will occur where the film images meet in the blend line due to overlapping or mismatching of film images causing double light exposure.

The difficulties and problems encountered with conventional projection and screening systems are obviated by the present invention which provides a film viewing arrangement for producing the effect or illusion that the spectator is actually in and surrounded by the environment depicted. For example, if the scene is of an underwater view in which people, fish and underwater flora are depicted, the spectator in his normal field of vision, will see the complete underwater scene on all sides and overhead, so as to produce the illusion that the spectator is actually under water, rather than merely looking at a picture of an underwater scene covering only a small portion of the normal field of vision. For dramatic effect, certain portions of the entire picture may be enlarged to show either detail of movement and emotions or perhaps facial expressions while the remaining portion of the complete picture is of a different and lesser image size. This dramatic effect is not possible by employing the teachings of the prior art. The present invention offers greater opportunities for creative film making and the broadening of dramatic scope due to its unique organization of separately controllable screens.

In a preferred form of the invention, a plurality of flat screens are arranged at a small angle adjacent to one another with an overhead circular screen arranged near the top portion of the plurality of screens so that all of the screens combined provide a hemispherical or dome shaped screening area for picture image exhibition. In front of the screens and disposed in a curved plane between the screens and the audience, there is provided a curved opaque mask which contains a number of viewing openings or apertures exposing the viewing surface of each of the plurality of screens. The openings or apertures are of smaller dimension than the screen size so that the edge marginal regions of the screens are hidden from the view of the audience. A plurality of projectors are mounted behind the plurality of screens and each projector is associated with a separate screen so that images from film carried in the projectors may be conveyed to the rear of each screen. The system of viewing openings or apertures formed in the mask permit only the central portion of a screen to be exposed to the view of the audience. The projection apparatus throws an image on the rear of each screen which fills the entire screen with the result that the peripheral edges of the image on the screen are blocked by the edge marginal regions of the mask from reaching the viewing audience.

The effect on the audience takes the form of a plurality of rear projected screen images which are separated by opaque portions of the grid-like mask which separate the various openings or apertures. By synchronizing the projection images from the projectors, a complete picture story or panoramic view, including sound effects, can be conveyed to the audience without encountering the undesirable effects of scattering, light bounce, distorted blend lines, streaking and other distorting conditions. The solid or opaque portions of the mask emphasize a definite break between adjacent projected images which allows for greater dramatic effect and artistic preparation of the film material than can otherwise be had. The viewing audience will not be alarmed by the definite break between adjacent projected images on the various screens since the viewing audience experiences such a viewing environment in every day activity such as, for example, viewing a scene from the interior of an automobile wherein the various stanchions and roof supports break up the panoramic view.

Therefore, it is a primary object of the present invention to provide a novel system of exhibiting still or motion pictures which permits the size of the projected images to vary on the screening apparatus whereby certain novel effects are produced.

It is another object of the present invention to provide a novel still or motion picture exhibiting apparatus which produces the effect or illusion that a spectator is actually in or surrounded by the environment depicted.

A further object of the present invention is to provide a film projection system which affords an audience a maximum note of realism without encountering the aforementioned distortion effects or undesired conditions.

Still a further object of the present invention is to provide a novel projection system wherein a masking means is provided to overcome the adverse effects normally encountered when employing adjoining screens and which normally constitute a disturbance to the audience.

It is still another object of the present invention to provide a novel viewing system which employs a plurality of flat screens arranged to present a composite panoramic view as viewed by an audience through a curved mask lying in a plane between the audience and the plurality of screens.

A feature further resides in the present invention since the novel picture viewing system allows greater dramatic and artistic effect to be exercised by film and picture makers at substantial economic savings over conventional screening and viewing systems.

The features and objects of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
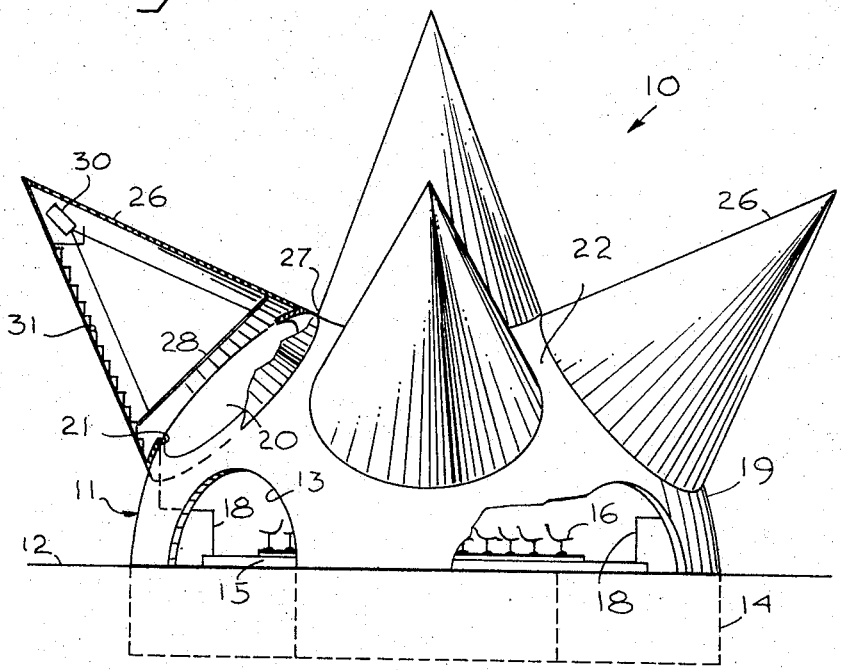
FIGURE 1 is an elevational view partially in section, of a novel image projection and exhibition screening system in accordance with the present invention illustrating the mask lying in a plane different from a plane in which the plurality of screens lie.
Figure 2:
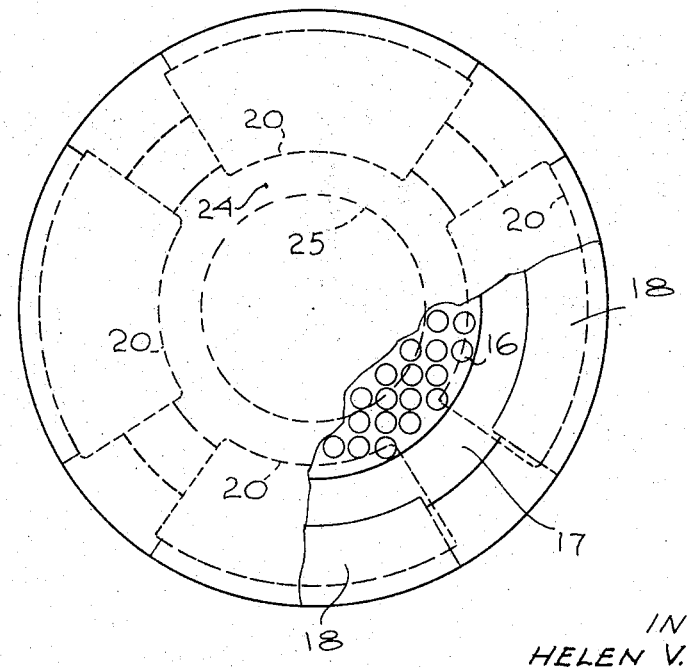
FIGURE 2 is a plan view of the apparatus shown in FIGURE 1, not including the projectors, illustrating the disposition of the mask, viewing screens and audience with respect to each other.

This invention will be understood in greater detail by reference to the following portion of the specification wherein the drawings are described. Referring now to FIGURES 1 and 2, a novel image projection and screening system and apparatus is shown in accordance with the present invention which includes a dome shaped theatre auditorium indicated in the general direction of arrow 10. The overall configuration of the auditorium is substantially hemispherical and comprises a shell 11 which is constructed on a ground level 12 having entrance and exit ports, such as port 13, arranged about the shell to facilitate the passage of the audience. Preferably, the shell is constructed over a pit 14 which may be employed for supplemental facilities such as storage, dressing rooms, offices and the like. A floor 15 is suitably installed over the pit area on which a plurality of seats, such as seat 16, may be supported. The seats are located in the center area of the auditorium and are circularly arranged in rows and columns to accommodate a viewing audience. Although any type of seat may be employed for the purpose of this invention, preferably, swivel seats which are capable of rotation about 360° are more desirous so that a spectator may have a complete and unobstructed view of the entire shell interior.

Encircling the arrangement of seats for the viewing audience, there is provided a circular aisle 17 which permits ingress and egress to the rows and columns of seats. Arranged about the outer periphery of the aisle, there is shown several elevated ramps, such as ramp 18 which may be employed as a stage to accommodate actors engaged in a theatrical performance.

It is to be noted that the shell of the auditorium is provided with a plurality of viewing openings or apertures, such as opening 20 which communicates the interior of the auditorium exteriorly of the shell. The opening may take any desired configuration such as, for example, a parallelogram, a rectangle, a square, a circle or the like. An inner surface 21 of the shell, and particularly those areas of the inner surface of the shell which adjoin adjacent openings, may be said to represent a composite opaque mask. The mask assumes the curvature of the overall dome configuration of the shell and the viewing openings are arranged substantially in the same horizontal plane around the mask in a continuous fashion. The viewing openings are separated only by a relatively narrow strip or rib 22. A centrally located circular viewing opening 25 is formed in the apex of the dome shaped shell which is separated from the top portion of the circularly disposed viewing opening 20 by means of a circular mask portion 24.

Figure 3:
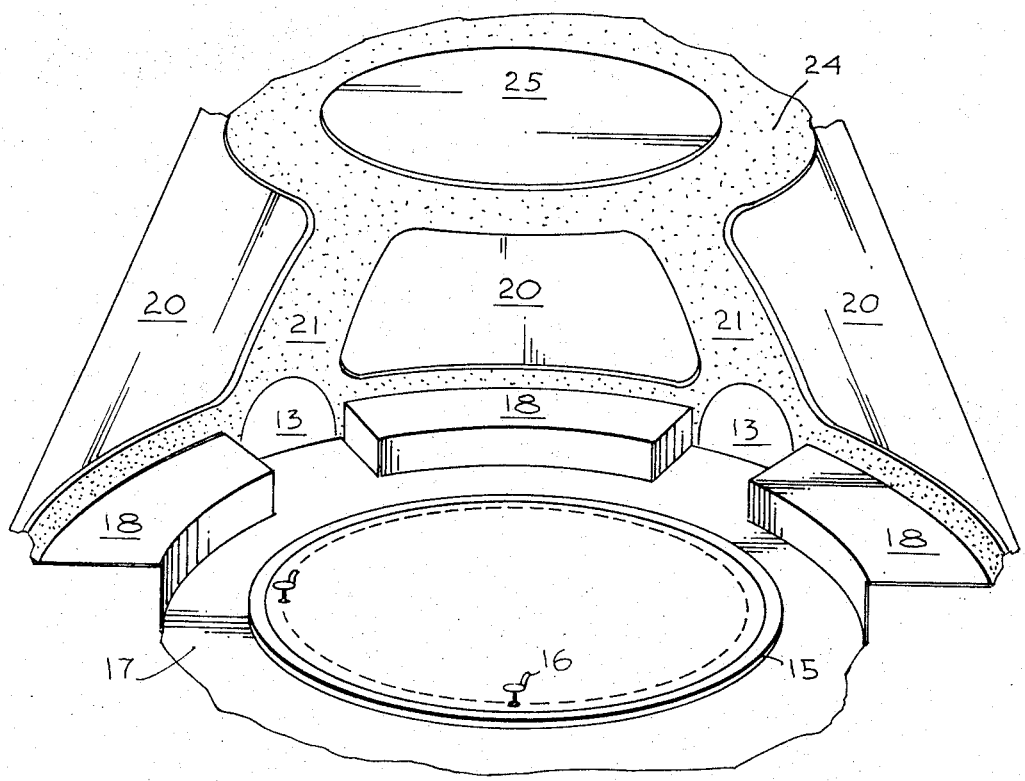
FIGURE 3 is a perspective view of the composite dome shaped viewing screen as seen from the audience area inside the novel auditorium.

About an external surface 19 of the shell, there is suitably mounted a plurality of conical configured projection chambers 26 having a base 27 which is of greater diameter than the viewing opening about which each projection is supported. Each projection chamber encloses nearest its base end a flat screen 28 which is of preferably translucent material adapted for serving as a viewing screen. The apex of the conical projection chamber is equipped with a suitable projection apparatus 30 including, when desired, suitable prismatic or equivalent optical devices adapted to project or throw a picture image upon the screen 28. The plurality of screens mounted directly behind each viewing opening permit the spacing of the screens equidistant from each other and in substantial alignment with the general overall contour of the shell so that the auditorium can be divided into a plurality of viewing sections or segments, including the portion of the shell overhead the audience so that the audience is completely surrounded by viewing screens which are separated only by relatively narrow portions or ribs of mask. Inasmuch as the screens are longer and wider than the viewing openings, the peripheral edge marginal regions of the screens are hidden from sight from the viewing audience due to the interference or interruption thereof by the ribs of the mask defining the viewing opening as illustrated in FIGURE 3.

Therefore, taking into consideration the normal field of vision of the seated spectator, particularly in a swivel chair, it can be seen that the plurality of projection screens represent a composite screen extending through an arc of 360° in the horizontal plane and extending through an arc of approximately 180° in the vertical plane which is sufficient for all practical purposes. It is to be understood that the mask curvature is not limited to this precise configuration either in extent or in shape, and that a mask extending through smaller arcs may be satisfactory for some purposes and parabolic, elliptical or other curves may, in some case be used to advantage.

In addition to the mounting and housing of the projector within the conical projection chamber, the chamber or space may be employed to house suitable sound producing equipment (not shown) which may include several units for each of the screens, or a common, centrally disposed unit for the entire group, the circumferential disposition of the screens being particularly adapted for the use of a unitary sound source of sufficient strength to be heard in the various portions of the auditorium. Where separate sound units are used for each screen, the whole assembly may be connected in parallel, each set being provided with its own amplifier system, thus enabling the accurate monitoring of the sound with respect to each section or portion of the auditorium.

Each of the film projectors 30 projects an image from a separate film, of course, and it will be understood that in taking the pictures to be projected in accordance with the invention, a plurality of films are made, five (5) in the present instance, with the field covered by the respective films corresponding to the viewing areas represented by each of the flat screens. That is, the field covered by one film would correspond to one screen area, the field covered by another film would correspond to another screen and so on. Furthermore, when it is desired that the action proceed from one screen area to another, a plurality of synchronously operated cameras may be used to make the separate films. All of the projectors must be operated in synchronous relation. Since various devices, such as innerlocked motors are available commercially for operating a plurality of projectors synchronously, such mechanisms are not illustrated or described herein.

The viewing screen is suitably attached to the inside surface of the walls of the conical chamber so that it is supported in a manner permitting a clear and unobstructed field between the rear side of the screen and the projector employed to throw the picture thereon. Accordingly, by resorting to a method of "rear projection" of a still or moving picture on the backside of the translucent screen, a background to a setting occupied by actors on the ramp 18 engaged in a theatrical production on the stage may be provided. Therefore, the viewing screen system of the present invention may be employed for the showing of motion pictures on a substantially composite dome shaped screen or the substantially composite dome shaped screen may be employed as a background to the setting of a dramatic production.

By substantially dome shaped, is meant that the construction of the auditorium according to the present invention, the plurality of screens provide a composite projection screen of great area, and is formed by the angular displacement of the plurality of screens with respect to each other to form a seemingly curved surface extending through any desired arc up to 360° in the horizontal plane, and through an arc of approximately 180° in the vertical plane, that is from the horizon to the zenith. Although each of the screens included in the plurality are flat, the mounting of the screens within the projection chambers when taken together follow the curvature of the dome shaped shell so that a composite curved viewing screen is offered to the viewing audience.

The illusion of a large curved viewing screen is aided by the fact that the arrangement of screens and the curved masks lie in different planes so that the vision of the audience is influenced by the curved mask to impute the illusion of curvature to the composite screen.

The interior surface of the shell, as shown in FIGURE 3, which may be said to be the mask, is preferably black in color and during viewing, the internal auditorium need not be illuminated except for perhaps small aisle lights and exit signs to meet building and safety codes. Inasmuch as the edge marginal regions of the viewing screens are blocked from the view of the audience by portions of the mask, problems normally encountered with blend lines between adjacent images are avoided. Consequently, image alignment, problems encountered with contrast, streaking and other difficulties inherent when a match of adjacent images are employed, are completely obviated. Through the use of the present invention by means of the rear projection system of illuminating the screen, cross-lighting and light bounce within the audience area is eliminated so that audience distraction and distortion is greatly eliminated. Since a feature of the invention resides in the concept of intentionally employing a strip of mask between adjacent portions of a composite screen, it is not necessary to precisely synchronize all films being projected on the plurality of screens forming the composite screen at the same instant and the necessity of precisely matched films is avoided. Furthermore, the concept further envisions greater flexibility in usage of dramatic technique by permitting the film of one projector to greatly increase the size of the particular image such that the image can well be out of scale with images being projected by films on adjacent screens forming the composite screen. In a sense, the dramatic technique envisioned herein may well utilize four of the screens to portray the background of a room having persons therein, while the fifth screen may be employed to show an enlarged facial image which in detail portrays expression and emotion.

A suitable staircase 31 may be provided in each projection chamber to permit the serving of the projector and screen as well as to provide for access to the projector for the changing of film.

Therefore, it is seen that the screening apparatus and/or auditorium of the present invention provides a medium for displaying unusual films of striking dramatic portrayal and that the same techniques may also be employed in connection with legitimate theatre dramatic production. The illusion represented by the apparatus gives the viewing audience complete feeling and sensation of involvement in the production being presented without distortion or distraction from apparatus and equipment associated with the production. The employment of a mask or grid to block or cover the blend lines between adjacent projected images on the screens, although disrupting the continuity of an entire 360° sequence of film, is less objectionable, if not completely unobjectionable, to a viewing audience once the production has gotten underway and story interest and plot take over.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:
1. A projected image panoramic screening system comprising:
   a circular audience seating arrangement;
   a plurality of flat screens arranged to encircle said seating arrangement wherein each screen includes a viewing surface facing said seating arrangement;
   a plurality of projectors arranged to simultaneously project film images against the reverse side of said screens opposite to said viewing surface; and
   a dome shaped curved mask disposed between said viewing surfaces of said plurality of screens and said seating arrangement and including viewing openings to expose a portion of the projected image from said viewing surfaces of each of said screens to said audience seating arrangement.

2. The invention as defined in claim 1 wherein a portion of said mask overlaps all of the edge marginal regions of said viewing surfaces of said screens to create the effect to a viewing audience of a continuous single panoramic view of the projected image on said plurality of screens.

3. The invention as defined in claim 2 wherein said plurality of viewing screens includes a circular screen disposed directly over said audience seating arrangement behind one of said mask viewing openings.

4. A panoramic screening apparatus comprising:
   a hemispherical shell having a plurality of viewing openings defined by edge marginal regions of said shell which constitute a mask;
   a plurality of projection chambers mounted on the exterior of said shell about each of said shell viewing openings;
   a flat viewing screen mounted within each of said projection chambers in close proximity to said view opening; each of said viewing screens having an image projection surface facing the interior of said shell which is of greater area than the area of said viewing openings as defined by said mask edge marginal regions;
   a projector mounted in each of said projector chambers and adapted to throw a picture image on the reverse side of each of said viewing screens; and
   an audience seating arrangement located within the interior of said shell and being in visual communication with a central portion of each of said viewing screen image projection surfaces as limited by said mask edge marginal regions.

5. The invention as defined in claim 4 wherein said audience seating arrangement includes a circular array of a plurality of swivelled spectator seats adapted to rotate about 360°.

6. The invention as defined in claim 4 wherein said plurality of projection chambers includes a projection chamber located at the apex of said hemispherical shell so that its viewing screen is directly over said audience seating arrangement behind one of said viewing openings.

7. A panoramic screening apparatus comprising:
   a circular audience seating arrangement having a plurality of swivel supported seats;
   a hemispherical shell covering said seating arrangement and co-axial therewith;
   said shell having a plurality of viewing openings defined by edge marginal regions of said shell constituting a mask;
   a plurality of translucent viewing screens mounted exteriorly of said shell whereby each screen is located in close proximity to each of said viewing openings;
   a projector associated with each of said viewing screens adapted to project picture images onto the rear side of each screen; and
   said mask edge marginal regions being related to each of said viewing screens so as to block the peripheral edges of said screens to allow only the central portion of said picture images to be exposed to said seating arrangement.

8. The invention as defined in claim 7 wherein each of said projectors and viewing screens are mounted in fixed spaced relationship to each other within a conically shaped projection chamber; said projection chambers being mounted on the external surface of said shell.

9. A panoramic picture image screening system comprising:
   a plurality of flat viewing screens arranged at small angles with respect to each other including an overhead circular viewing screen to form, in combination, a substantially dome shaped screening area;
   a circular audience seating arrangement located below said overhead viewing screen and being coaxial therewith;
   a curved, dome shaped opaque mask disposed between said audience seating arrangement and said screening area and having a plurality of openings generally exposing said viewing screens to said seating arrangement; and
   said masking openings being defined by portions of said mask which overlap said viewing screens to obstruct visual communication of the viewing screen margins from said seating arrangement.

10. The invention as defined in claim 9 including a ramp located between said seating arrangement and the lowest margin of said viewing screens so that said screening area serves as a background to said ramp.

References Cited

UNITED STATES PATENTS

| | | | |
|---|---|---|---|
| 2,030,300 | 2/1936 | Jackman | 88—24 |
| 2,304,434 | 12/1942 | Ayres | 88—24 |
| 3,003,257 | 10/1961 | Madden | 88—24 |
| 3,107,577 | 10/1963 | Adams | 352—70 |

FOREIGN PATENTS 930,077   6/1923   Austria.

OTHER REFERENCES

"Camera," 43rd year, No. 6, June 1964, pp. 13–18, "Polyvision" by Gessler.

"Disneyland's Circarama," by Norman C. Lipton, dated December 1955.

Popular Photography, vol. 37, No. 6, pp. 96–97.

NORTON ANSHER, *Primary Examiner.*

R. M. SHEER, *Assistant Examiner.*